(12) United States Patent
Yeo et al.

(10) Patent No.: US 12,485,783 B2
(45) Date of Patent: Dec. 2, 2025

(54) CONVERTER AND POWER CONVERSION SYSTEM FOR CONVERTING POWER OF AUXILIARY BATTERY USING OBC

(71) Applicants: Kia Corporation, Seoul (KR); Hyundai Motor Company, Seoul (KR); Foundation for Research and Business, Seoul National University of Science and Technology, Seoul (KR)

(72) Inventors: In Yong Yeo, Bucheon-si (KR); Youn Sik Lee, Suwon-si (KR); Se Wan Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 421 days.

(21) Appl. No.: 18/054,759

(22) Filed: Nov. 11, 2022

(65) Prior Publication Data

US 2024/0051411 A1 Feb. 15, 2024

(30) Foreign Application Priority Data

Aug. 9, 2022 (KR) .......................... 10-2022-0099368

(51) Int. Cl.
*B60L 53/20* (2019.01)
*B60L 58/18* (2019.01)
(Continued)

(52) U.S. Cl.
CPC ............... *B60L 53/20* (2019.02); *B60L 58/18* (2019.02); *H01M 10/425* (2013.01);
(Continued)

(58) Field of Classification Search
CPC ...... B60L 53/20; B60L 58/18; B60L 2210/12; H02J 7/342; H02J 2207/20; H01M 10/44;
(Continued)

(56) References Cited

U.S. PATENT DOCUMENTS 8,047,316 B2 * 11/2011 Takami ................. B60W 20/00
180/65.29
8,471,521 B2 * 6/2013 Stewart ................. H01M 10/30
320/132
(Continued)

FOREIGN PATENT DOCUMENTS

JP 2020127353 A 8/2020
KR 101809913 B1 12/2017
(Continued)

*Primary Examiner* — Hau V Phan
(74) *Attorney, Agent, or Firm* — Slater Matsil, LLP

(57) ABSTRACT

In an embodiment, a power conversion system includes: an on-board charger; a main battery configured to be recharged with power and to supply the recharged power to a motor, thereby supplying rotation force to a wheel of a vehicle; an auxiliary battery configured to recharge the main battery or to assist a power supply function of the main battery; and a power converter connected to the auxiliary battery, the power converter comprising a bypass circuit and a buck switch. A part of the on-board charger and the power converter constitute a DC-DC converter, and the buck switch is configured to be repeatedly switched on and off when a voltage of the auxiliary battery is higher than a voltage of the main battery, and does not operate when the voltage of the auxiliary battery is not higher than the voltage of the main battery.

20 Claims, 4 Drawing Sheets

(51) Int. Cl.
  *H01M 10/42* (2006.01)
  *H01M 10/44* (2006.01)
  *H02J 7/34* (2006.01)
  *H02M 3/158* (2006.01)

(52) U.S. Cl.
  CPC ............ *H01M 10/44* (2013.01); *H02J 7/342* (2020.01); *H02M 3/158* (2013.01); *B60L 2210/12* (2013.01); *H01M 2010/4271* (2013.01); *H01M 2220/20* (2013.01); *H02J 2207/20* (2020.01)

(58) Field of Classification Search
  CPC ......... H01M 3/158; H01M 2010/4271; H01M 2220/20
  USPC ....................................................... 180/65.1
  See application file for complete search history.

(56) References Cited

U.S. PATENT DOCUMENTS

| | | | | |
|---|---|---|---|---|
| 9,112,373 | B2* | 8/2015 | Ghabbour | B60L 53/66 |
| 10,833,379 | B2* | 11/2020 | Scaringe | H01M 10/63 |
| 11,038,367 | B2* | 6/2021 | Sone | B60L 50/66 |
| 11,241,973 | B2* | 2/2022 | Wang | B60L 53/62 |
| 11,260,762 | B2* | 3/2022 | Badger, II | B60L 53/68 |
| 2005/0190524 | A1* | 9/2005 | Yamamoto | B60K 23/08 |
| | | | | 361/139 |
| 2011/0084664 | A1* | 4/2011 | White | B60L 53/14 |
| | | | | 320/136 |
| 2013/0119932 | A1* | 5/2013 | Moon | B60L 58/20 |
| | | | | 320/109 |
| 2015/0295445 | A1* | 10/2015 | Hasegawa | H02J 7/342 |
| | | | | 320/107 |
| 2016/0121749 | A1* | 5/2016 | Mensah-Brown | H02J 7/34 |
| | | | | 307/10.1 |
| 2016/0276719 | A1* | 9/2016 | Kikuchi | H01M 10/425 |
| 2017/0203658 | A1* | 7/2017 | Jang | H02J 7/04 |
| 2017/0373628 | A1* | 12/2017 | Nozawa | B60L 3/0084 |
| 2018/0312074 | A1* | 11/2018 | Tsutsumi | B60L 3/0046 |
| 2019/0312499 | A1* | 10/2019 | Ha | H02J 7/02 |
| 2020/0079231 | A1* | 3/2020 | Song | H01M 10/443 |
| 2020/0207234 | A1* | 7/2020 | Pak | H02M 1/4241 |
| 2021/0252990 | A1* | 8/2021 | Wang | B60L 53/22 |
| 2022/0194238 | A1* | 6/2022 | Jang | B60L 58/12 |

FOREIGN PATENT DOCUMENTS

| | | |
|---|---|---|
| KR | 101811062 B1 | 12/2017 |
| KR | 102330256 B1 | 11/2021 |
| WO | 2020142231 A1 | 7/2020 |

* cited by examiner

CONVERTER AND POWER CONVERSION SYSTEM FOR CONVERTING POWER OF AUXILIARY BATTERY USING OBC

CROSS-REFERENCE TO RELATED APPLICATIONS

This application claims the benefit of Korean Patent Application No. 10-2022-0099368, filed on Aug. 9, 2022, which application is hereby incorporated herein by reference.

TECHNICAL FIELD

The present invention relates to a power conversion system, and more particularly to a converter and a power conversion system for converting power of an auxiliary battery for a vehicle using an on-board charger (OBC).

BACKGROUND

In pace with recently increased interest in the environment, use of an eco-friendly vehicle provided with an electric motor as a power source is increasing. Such an eco-friendly vehicle is also referred to as an electrified vehicle, and as a representative example thereof, there are a hybrid electric vehicle (HEV) or an electric vehicle (EV).

Generally, in mini or light electric vehicles, cost competitiveness is of utmost importance, and cost reduction of power electronics (PE) elements as well as a high-voltage battery is very important. Meanwhile, the most expensive one of high-voltage power electronics elements is a high-voltage battery. Although the cost of such a power electronics element may be reduced through minimization of the capacity of the power electronics element, a reduction in the capacity of the high-voltage battery may result in not only a reduction in the range of an electric vehicle, but also a reduction in outputs of a motor and an inverter.

Recently, studies attempting a reduction in capacity and a reduction in voltage in a battery have been conducted in order to minimize the price of an electric vehicle. In order to minimize the electric vehicle price, development of an electric vehicle constituted by a 48V-grade system is also being conducted. In addition, development of a system capable of not only increasing the range of an electric vehicle, but also enhancing outputs of a motor and an inverter, through addition of a replaceable auxiliary battery to a main battery of 48V, is being conducted.

Meanwhile, although rated capacities of the main battery and the auxiliary battery are 48V, each of the main battery and the auxiliary battery may have an output of about 30 to 60V in accordance with a state of charge (SOC) thereof. When batteries different in SOC are directly interconnected, there is a danger of fire.

Therefore, the current situation in the present technical field is that it is necessary to provide a converter capable of managing the state of charge of each auxiliary battery, effectively controlling charging current, and enabling each battery to be effectively used.

SUMMARY

It will be appreciated by persons skilled in the art to which the present invention pertains that technical problems to be solved by the present invention are not limited to the above-described technical problems, and other technical problems will be more clearly understood from the following description.

In accordance with an aspect of the present invention, the above and other objects can be accomplished by the provision of a power conversion system including an on-board charger, a main battery configured to be recharged with power and to supply the charged power to a motor, thereby supplying rotation force to a wheel of a vehicle, at least one auxiliary battery configured to recharge the main battery or to assist a power supply function of the main battery, and a power converter connected to the at least one auxiliary battery, the power converter including at least one bypass circuit and at least one buck switch, wherein a part of the on-board charger and the power converter constitute a DC-DC converter.

The DC-DC converter may convert a voltage of the auxiliary battery into a voltage for recharging of the main battery in accordance with the ON/OFF switching operation of the buck switch.

The on-board charger may include at least one transformer including a primary coil and a secondary coil, at least one rectifier circuit including a plurality of diodes, and at least one inductor.

The buck switch may operate to be repeatedly switched on and off when the voltage of the auxiliary battery is higher than a voltage of the main battery, and may not operate when the voltage of the auxiliary battery is not higher than the voltage of the main battery.

The bypass circuit may electrically interconnect the auxiliary battery and the main battery when the voltage of the auxiliary battery is equal to the voltage of the main battery.

The at least one bypass circuit may include a plurality of bypass circuits, the at least one buck switch may include a plurality of buck switches, the at least one transformer may include a plurality of transformers, the at least one rectifier circuit may include a plurality of rectifier circuits, and the at least one inductor may include a plurality of inductors. The at least one auxiliary battery may include a plurality of auxiliary batteries connected to respective bypass circuits, respective buck switches, respective secondary coils of respective transformers, respective rectifier circuits, and respective inductors, and a power supply path of each of the auxiliary batteries connected to the main battery may be switched by a corresponding one of the bypass circuits and a corresponding one of the buck switches.

The at least one auxiliary battery comprises a plurality of auxiliary batteries connected to respective bypass circuits and respective relay switches. Each of the relay switches may connect or disconnect a corresponding one of the auxiliary batteries to or from the buck switch, the secondary coil, the rectifier circuit, and the inductor. A power supply path of each of the auxiliary batteries connected to the main battery may be switched by the buck switch and the bypass circuit connected to the auxiliary battery.

The relay switches may be set such that only one thereof is switched on at one time.

The relay switches may be sequentially switched on in accordance with a predetermined priority order.

The auxiliary battery may be provided in the form of a swappable battery.

The bypass circuit may include a diode, and a bypass switch connected to the diode in series.

In accordance with another aspect of the present invention, there is provided a DC-DC converter receiving an input voltage, thereby generating an output voltage, wherein the DC-DC converter is connected to a main battery and at least one auxiliary battery, comprises at least one bypass circuit and at least one buck switch, and is coupled to a part of an on-board charger, to receive the input voltage from the auxiliary battery, thereby generating an output voltage to be output to the main battery.

The DC-DC converter may convert the voltage of the auxiliary battery into a voltage for recharging of the main battery in accordance with an ON/OFF switching operation of the buck switch.

The on-board charger may include at least one transformer including a primary coil and a secondary coil, at least one rectifier circuit including a plurality of diodes, and at least one inductor.

The buck switch may operate to be repeatedly switched on and off when the voltage of the auxiliary battery is higher than a voltage of the main battery, and may not operate when the voltage of the auxiliary battery is not higher than the voltage of the main battery.

The bypass circuit may electrically interconnect the auxiliary battery and the main battery when the voltage of the auxiliary battery is equal to the voltage of the main battery.

The at least one bypass circuit may include a plurality of bypass circuits, the at least one buck switch may include a plurality of buck switches, the at least one transformer may include a plurality of transformers, the at least one rectifier circuit may include a plurality of rectifier circuits, and the at least one inductor may include a plurality of inductors. The at least one auxiliary battery may include a plurality of auxiliary batteries connected to respective bypass circuits, respective buck switches, respective secondary coils of respective transformers, respective rectifier circuits, and respective inductors, and a power supply path of each of the auxiliary batteries connected to the main battery may be switched by a corresponding one of the bypass circuits and a corresponding one of the buck switches.

The at least one auxiliary battery may include a plurality of auxiliary batteries connected to respective bypass circuits and respective relay switches. Each of the relay switches may connect or disconnect a corresponding one of the auxiliary batteries to or from the buck switch, the secondary coil, the rectifier circuit, and the inductor. A power supply path of each of the auxiliary batteries connected to the main battery may be switched by the buck switch and the bypass circuit connected to the auxiliary battery.

The relay switches may be set such that only one thereof is switched on at one time.

The relay switches may be sequentially switched on in accordance with a predetermined priority order.

The bypass circuit may include a diode, and a bypass switch connected to the diode in series.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
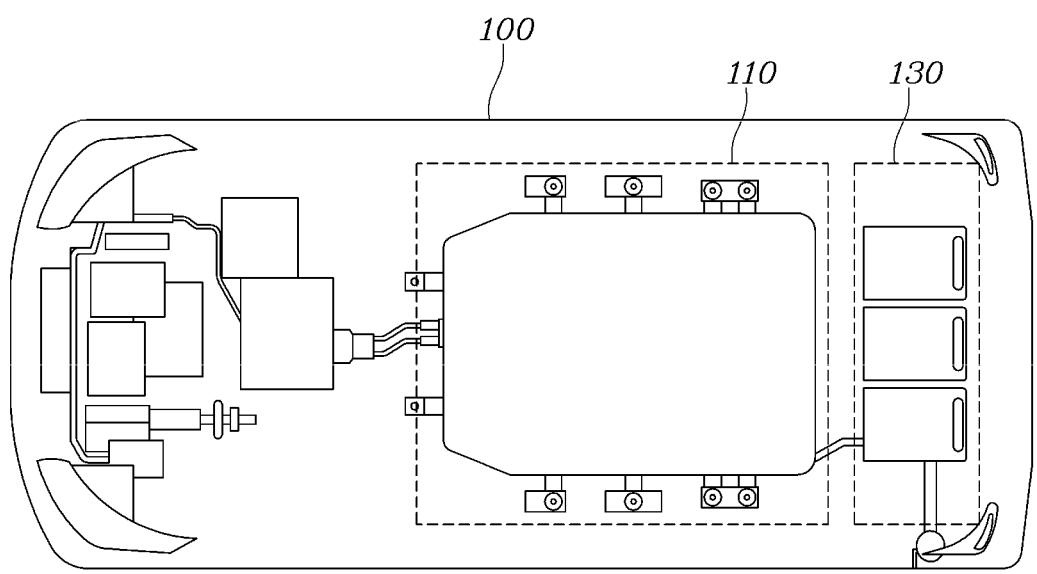
FIG. 1 shows a vehicle to which a power conversion system according to an exemplary embodiment of the present invention is applied.

Hereinafter, embodiments of the present invention will be described in detail with reference to the accompanying drawings, and the same or similar elements are designated by the same reference numerals regardless of the numerals in the drawings and redundant description thereof will be omitted. The suffixes "module" and "unit" of elements herein are used for convenience of description and thus can be used interchangeably and do not have any distinguishable meanings or functions. In the following description of the embodiments of the present invention, a detailed description of known functions and configurations incorporated herein will be omitted when it may obscure the subject matter of the embodiments of the present invention. In addition, the embodiments of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

In this specification, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

In various embodiments a converter capable of managing a state of charge of each auxiliary battery and effectively controlling charging current is provided. The converter may also be capable of enabling batteries to be effectively used.

FIG. 1 shows a vehicle 100 to which a power conversion system according to an exemplary embodiment of the present invention is applied.

Referring to FIG. 1, the vehicle 100 includes a main battery 110 and an auxiliary battery 130. The vehicle 100 uses energy stored in the main battery 110 as a power source for driving a motor. When the stored energy of the main battery 110 is discharged, the vehicle 100 receives power from the auxiliary battery 130, thereby recharging the main battery 110.

Figure 2:
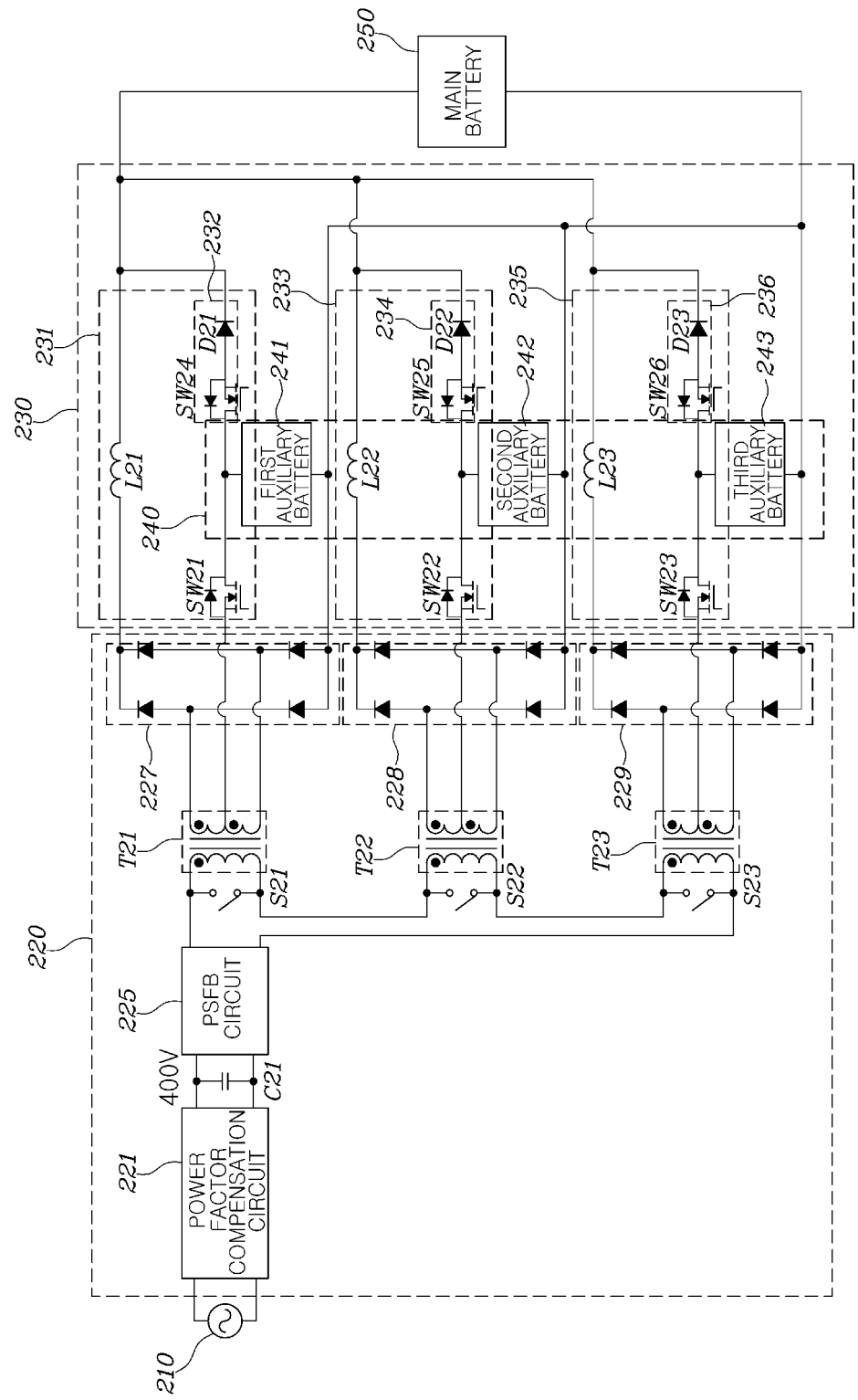
FIG. 2 shows a power conversion system according to an exemplary embodiment of the present invention.

FIG. 2 shows a power conversion system according to an exemplary embodiment of the present invention.

Referring to FIG. 2, the power conversion system according to this embodiment includes an AC power source 210, an on-board charger (OBC) 220, a power converter 230, an auxiliary battery 240, and a main battery 250.

AC power from the AC power source 210 is applied to the on-board charger 220 in order to recharge the main battery 250. In this case, the AC power source 210 may be a power source installed in external charging equipment.

The on-board charger 220 receives AC power from the AC power source 210, and converts the AC power into a DC voltage capable of recharging the main battery 250, and then supplies the DC voltage to the main battery 250. The on-board charger 220 includes a power factor compensation circuit 221, a link capacitor C21, a phase shift full bridge (PSFB) circuit 225, first to third relay switches S21, S22, and S23, first to third transformers T21, T22, and T23, and first to third rectifier circuits 227, 228, and 229. In this case, the power factor compensation circuit 221, the link capacitor C21, the PSFB circuit 225, the first to third relay switches S21, S22, and S23, the first to third transformers T21, T22, and T23, and the first to third rectifier circuits 227, 228, and 229 may be implemented in various topologies in the present technical field.

The power converter 230 converts a voltage of the auxiliary battery 240 into a voltage having a level suitable for charging of the main battery 250 through a combination thereof with a part of circuits of the on-board charger 220. In this case, since both the auxiliary battery 240 and the main battery 250 have DC voltages, the power converter 230 functions as a DC-DC converter. In this case, the power converter 230 may convert a voltage of the auxiliary battery 240 through a combination thereof with secondary coils of the first to third transformers T21, T22, and T23 and the first to third rectifier circuits 227, 228, and 229.

In this case, the power converter 230 includes a plurality of power converters 231, 233, and 235 equal in number to a plurality of auxiliary batteries 241, 242, and 243 such that the power converters 231, 233, and 235 are connected to the auxiliary batteries 241, 242, and 243, respectively. The power converters 231, 233, and 235 are connected in parallel to a secondary side of the on-board charger 220.

Meanwhile, the power converters 231, 233, and 235 includes respective buck switches SW21, SW22, and SW23, respective inductors L21, L22, and L23, and respective bypass circuits 232, 234, and 236.

In this case, each of the inductors L21, L22, and L23 is connected, at one end thereof, to a corresponding one of the rectifier circuits 227, 228, and 229 while being connected, at the other end thereof, to the main battery 250.

Although the first to third inductors L21, L22, and L23 are shown as constituting a part of the power converter 230 in this embodiment, the first to third inductors L21, L22, and L23 may constitute a part of the on-board charger 220.

In addition, each of the buck switches SW21, SW22, and SW23 is connected, at one end thereof, to a corresponding one of the first to third transformers T21, T22, and T23 while being connected, at the other end thereof, to a corresponding one of the bypass circuits 232, 234, and 236 in series.

In addition, each of the bypass circuits 232, 234, and 236 is connected, at one end thereof, to a corresponding one of the buck switches SW21, SW22, and SW23 in series while being connected, at the other end thereof, to a node between a corresponding one of the inductors L21, L22, and L23 and the main battery 250.

In this case, each power converter may operate as a buck converter through a combination thereof with the secondary coil of the corresponding transformer and the corresponding rectifier circuit.

For example, the first power converter 231 may operate as a buck converter through a combination thereof with the first transformer T21 and the first rectifier circuit 227.

In this case, the first buck switch SW21 operates to be rapidly switched on/off when the voltage of the first auxiliary battery 241 is higher than the voltage of the main battery 250. On the other hand, the first buck switch SW21 does not operate when the voltage of the first auxiliary battery 241 is not higher than the voltage of the main battery 250. In this case, power supplied from the first auxiliary battery 241 to the main battery 250 may be used to recharge the main battery 250.

When the voltage of the first auxiliary battery 241 is equal to the voltage of the main battery 250, the first bypass switch SW24 is switched on, thereby electrically interconnecting the first auxiliary battery 241 and the main battery 250.

The auxiliary battery 240 functions as an energy source for recharging the main battery 250 or driving a motor of the main battery 250.

The auxiliary battery 240 may include a plurality of auxiliary batteries 241, 242, and 243. Although the auxiliary battery 240 is shown as being configured through inclusion of the first to third auxiliary batteries 241, 242, and 243 in the embodiment of FIG. 2, this is only illustrative, and the auxiliary battery 240 may include various numbers of auxiliary batteries.

Each of the auxiliary batteries 241, 242, and 243 is connected, at one end thereof, to a node between a corresponding one of the buck switches SW21, SW22, and SW23 and a corresponding one of the bypass circuits 232, 234, and 236 while being connected, at the other end thereof, to a node between a corresponding one of the rectifier circuits 227, 228, and 229 and the main battery 250.

In this case, the auxiliary battery 240 may be a low-voltage output type battery and, may be, for example, a 48V standard battery. Although the auxiliary battery 240 is of a 48V standard, the auxiliary battery 240 may have an output in various ranges of 30 to 60V in accordance with a state of charge (SOC) thereof.

In this case, the auxiliary battery 240 may be provided in the form of a swappable battery.

The main battery 250 is recharged with power and supplies the charged power to a motor (not shown), thereby supplying rotation force to a wheel of a vehicle. In this case, the main battery 250 may be recharged by DC charging power supplied from the on-board charger 220 or the auxiliary battery 240. The main battery 250 may be a low-voltage output type battery and, may be, for example, a 48V standard battery. In this case, although the main battery 250 is of a 48V standard, the main battery 250 may have an output in various ranges of 30 to 60V in accordance with a state of charge (SOC) thereof.

Figure 3A:
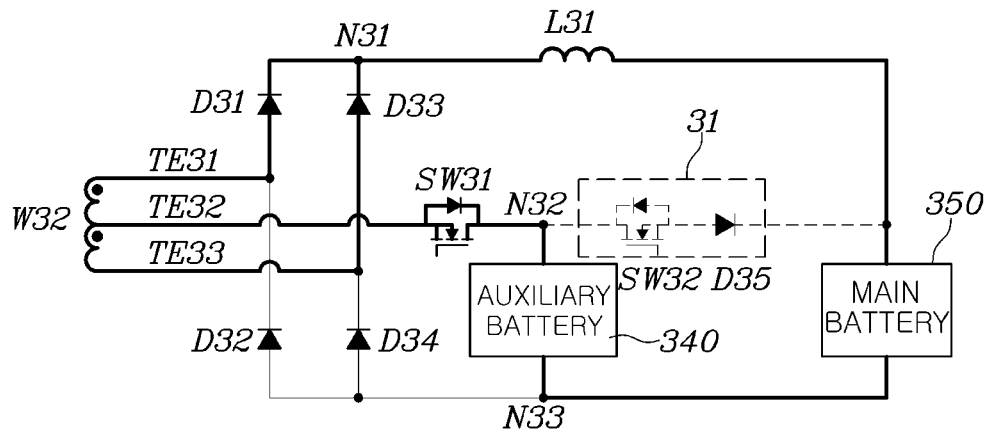
FIGS. 3a to 3c shows a power conversion procedure of a power conversion circuit constituting a part of a power conversion system according to an exemplary embodiment of the present invention.
Figure 3B:
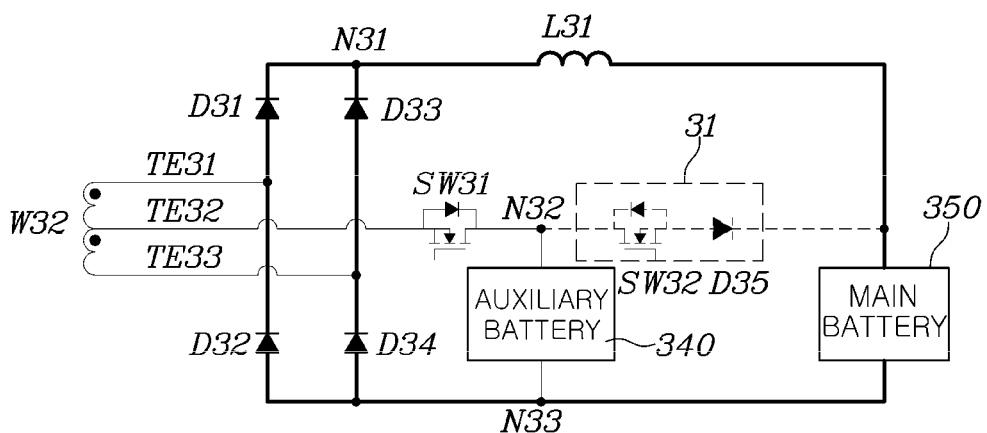
Figure 3C:
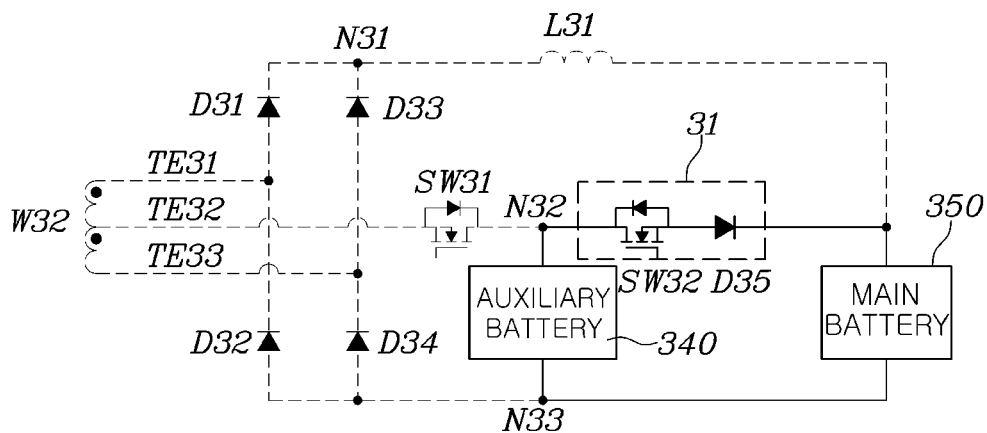

FIGS. 3a to 3c shows a power conversion procedure of a power conversion circuit constituting a part of a power conversion system according to an exemplary embodiment of the present invention. The power conversion circuit in this embodiment converts an input voltage in the form of a DC voltage into an output voltage in the form of a DC voltage and, as such, may be defined as a DC-DC converter.

FIG. 3a shows a flow of current in the DC-DC converter in an ON state of a buck switch. FIG. 3b shows a flow of current in the DC-DC converter in an OFF state of the buck switch. FIG. 3c shows a flow of current in the DC-DC converter when the buck switch does not operate, and a bypass circuit operates.

Referring to FIGS. 3a to 3c, the DC-DC converter includes a secondary winding W32 of a transformer including first to third terminals TE31, TE32, and TE33, first to fourth diodes D31, D32, D33, and D34, a buck switch SW31, an inductor L31, and a bypass circuit 31. In this case, the bypass circuit 31 may include a bypass switch SW32 and a fifth diode D35.

Meanwhile, the DC-DC converter includes a first node N31. The first diode D31 is disposed between the first terminal TE31 and the first node N31. The second diode D32 is disposed between the first terminal TE31 and a main battery 350. The third diode D33 is disposed between the third terminal TE33 and the first node N31. The fourth diode D34 is disposed between the third terminal TE33 and the main battery 350.

In addition, the inductor L31 is disposed between the first node N31 and the main battery 350. The buck switch SW31 and the bypass circuit 31 are disposed in series between the second terminal TE32 and the main battery 350.

Meanwhile, an auxiliary battery 340 is connected, at one end thereof, to a second node N32 between the buck switch SW31 and the bypass circuit 31 while being connected, at the other end thereof, to the main battery 350.

When the voltage of the auxiliary battery 340 is higher than the voltage of the main battery 350, the bypass switch SW32 is switched to be in an OFF state, and the buck switch SW31 is rapidly switched between ON and OFF states.

Referring to FIG. 3a, when the buck switch SW31 is in an ON state, current from the auxiliary battery 340 flows to the first and third terminals TE31 and TE33 via the second node N32, the buck switch SW31 and the second terminal TE32 of the secondary winding W32, flows through the first and third diodes D31 and D33 which are disposed in a forward direction that current is flowable, and then recharges the main battery 350 after passing through the inductor L31. In this case, a voltage corresponding to the voltage of the auxiliary battery 340 and the voltage of the main battery 350 is applied to the inductor L31.

On the other hand, referring to FIG. 3b, when the buck switch SW31 is switched to an OFF state under the condition that the bypass switch SW32 is maintained in an OFF state because the voltage of the auxiliary battery 340 is higher than the voltage of the main battery 350, the voltage of the main battery 350 is reversely applied to the inductor L31, thereby causing freewheeling of current.

Meanwhile, when the voltage of the auxiliary battery 340 becomes equal to the voltage of the main battery 350, the bypass switch SW32 is switched to an ON state. Referring to FIG. 3c, the auxiliary battery 340 and the main battery 350 are electrically interconnected through the bypass circuit 31. In this case, when the bypass circuit 31 is constituted by a high-capacity bypass circuit, the auxiliary battery 340 may enable discharge of high current.

In accordance with this embodiment, it may be possible to minimize the capacity of a relatively expensive buck converter while maximizing the capacity of the relatively inexpensive bypass circuit, thereby achieving a reduction in cost. In addition, it may be possible to increase the range of an electric vehicle and to enhance vehicle power performance by utilizing, in a converter for the auxiliary battery, a part of the on-board charger (OBC) already equipped in the vehicle.

Figure 4:
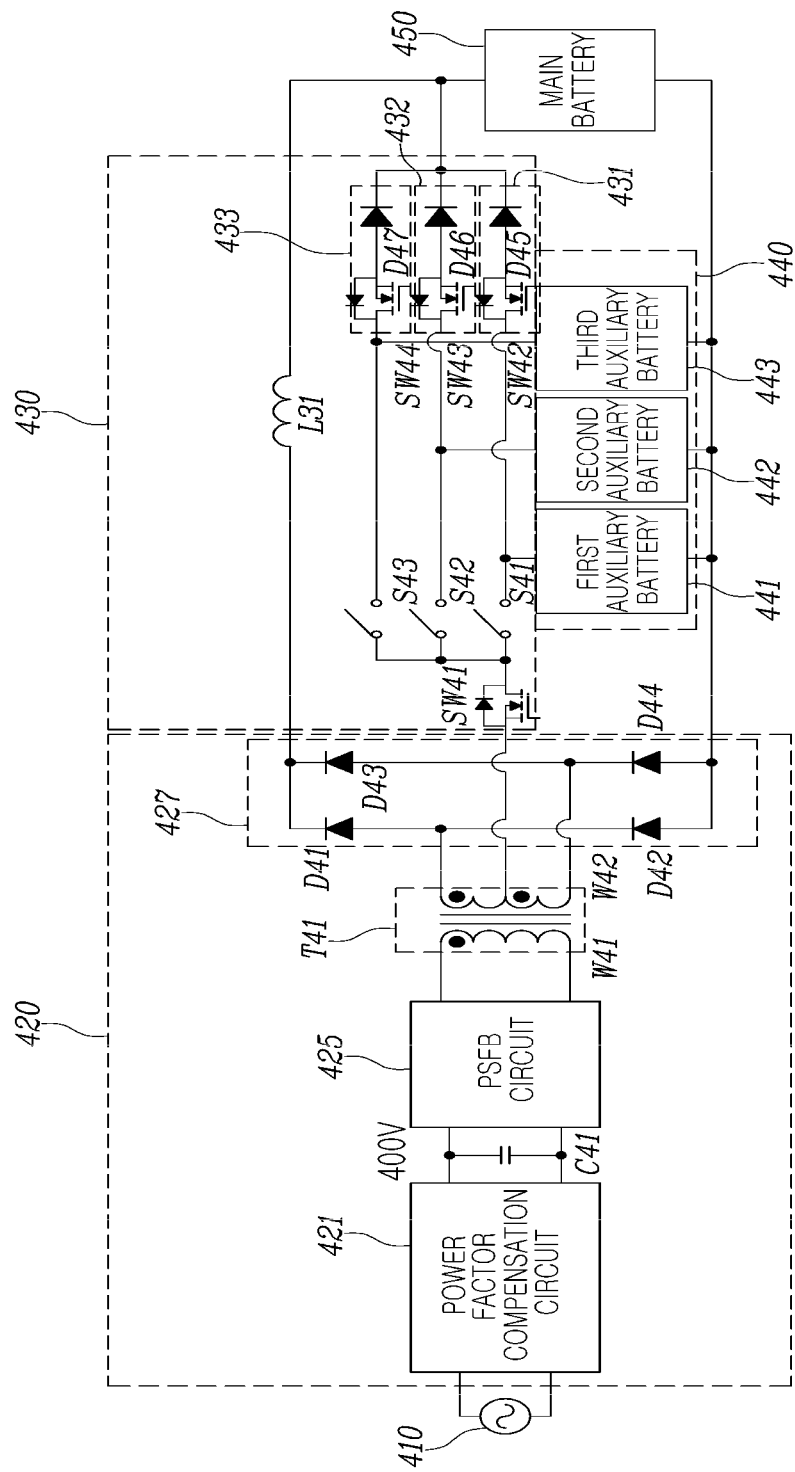
FIG. 4 shows a power conversion system according to another exemplary embodiment of the present invention.

FIG. 4 shows a power conversion system according to another exemplary embodiment of the present invention.

Referring to FIG. 4, the power conversion system according to this embodiment includes an AC power source 410, an on-board charger 420, a power converter 430, an auxiliary battery 440, and a main battery 450.

AC power from the AC power source 410 is applied to the on-board charger 420 in order to recharge the main battery 450. In this case, the AC power source 410 may be a power source installed in external charging equipment.

The on-board charger 420 converts AC power from the AC power source 410 into a DC voltage capable of recharging the main battery 450, and then supplies the DC voltage to the main battery 450. The on-board charger 420 includes a power factor compensation circuit 421, a link capacitor C41, a phase shift full bridge (PSFB) circuit 425, a transformer T41, and a rectifier circuit 427.

The power converter 430 converts a voltage of the auxiliary battery 440 into a voltage having a level suitable for charging of the main battery 450 through a combination thereof with a part of circuits of the on-board charger 420. In this case, the power converter 430 may convert a voltage of the auxiliary battery 440 into a voltage for recharging of the main battery 450 through a combination thereof with a secondary coil W42 of the transformer T4 and the rectifier circuit 427. In this case, since the power converter 430, the secondary coil W42, and the rectifier circuit 427 convert an input DC voltage into an output DC voltage, the power converter 430 may be defined as a DC-DC converter.

The power converter 430 may include a buck switch SW41, an inductor L31, a plurality of relay switches S41, S42, and S43 connected between respective auxiliary batteries 441, 442, and 443 and the buck switch SW41, and a plurality of bypass circuits 431, 432, and 433 connected between respective auxiliary batteries 441, 442, and 443 and the main battery S450.

In this case, the bypass circuits 431, 432, and 433 may include respective bypass switches SW42, SW43, and SW44 and respective diodes D45, D46, and D47.

In this case, the inductor L31 is connected, at one end thereof, to the rectifier circuit 427 while being connected, at the other end thereof, to the main battery 450.

In addition, the buck switch SW41 is connected, at one end thereof, to the transformer T41 while being connected, at the other end thereof, to a node to which the relay switches S41, S42, and S43 are connected in parallel.

In addition, each of the bypass circuits 431, 432, and 433 is connected, at one end thereof, to a corresponding one of the relay switches S41, S42, and S43 in series while being connected, at the other end thereof, to the main battery 450.

In this case, the buck switch SW41 is connected to the auxiliary batteries 441, 442, and 443 when the relay switches S41, S42, and S43 are switched to an ON state, respectively. Under this condition, the buck switch SW41 operates to be rapidly switched on/off when voltages of the auxiliary batteries 441, 442, and 443 are higher than the voltage of the main battery 450. On the other hand, the buck switch SW41 does not operate when the voltages of the auxiliary batteries 441, 442, and 443 are not higher than the voltage of the main battery 450. Accordingly, when the voltages of the auxiliary batteries 441, 442, and 443 are higher than the voltage of the main battery 450, and the relay switches S41, S42, and S43 connected between respective auxiliary batteries 441, 442, and 443 and the buck switch SW41 are in an ON state, the voltages of the auxiliary batteries 441, 442, and 443 are converted into a voltage for recharging of the main battery 450 through the buck switch SW41, the rectifier circuit 427, the secondary coil W42 of the transformer T41, and the inductor L31, thereby recharging the main battery 450.

Meanwhile, when the voltages of the auxiliary batteries 441, 442, and 443 respectively connected to the bypass circuits 431, 432, and 433 are equal to the voltage of the main battery 550, circuits of the bypass circuits 431, 432, and 433 operate to electrically connect the auxiliary batteries 441, 442, and 443 to the main battery 450. In this case, power supplied from the auxiliary batteries 441, 442, and 443 via the bypass circuits 431, 432, and 433 may assist a function of an energy source for driving a motor of the main battery 450.

In this case, the relay switches S41, S42, and S43 may be set such that only one thereof is switched on at one time.

In addition, the relay switches S41, S42, and S43 may be set to be sequentially switched on in accordance with a predetermined priority order or a predetermined condition.

For example, the first to third relay switches S41, S42, and S43 may be sequentially switched on in an order of the first, second, and third relay switches S41, S42, and S43 respectively connected to the first, second, and third auxiliary batteries 441, 442, and 443. When the voltage of one of the first to third auxiliary batteries 441, 442, and 443 becomes equal to the voltage of the main battery 450, the relay switch connected to the auxiliary battery, the voltage of which becomes equal to the voltage of the main battery 450, may be switched off, and the relay switch next to the former relay switch may then be switched on.

In detail, when voltages of all of the first to third auxiliary batteries 441, 442, and 443 are higher than the voltage of the main battery 450, the first relay switch S41 is switched on until the voltage of the first auxiliary battery 441 becomes equal to the voltage of the main battery 450 and, as such, the main battery 450 is recharged with the voltage from the first auxiliary battery 441. When the voltage of the first auxiliary battery 441 becomes equal to the voltage of the main battery 450, the first relay switch S41 is switched off and, as such, current may flow between the first auxiliary battery 441 and the main battery 450 via the first bypass circuit 431. In this case, the first auxiliary battery 441 may assist a function of an energy source for driving the motor of the main battery 450.

In this case, when the voltage of the second auxiliary battery 442 is higher than the voltage of the main battery 450, the second relay switch S42 is switched on until the voltage of the second auxiliary battery 442 becomes equal to the voltage of the main battery 450 and, as such, the main battery 450 is recharged with the voltage from the second auxiliary battery 442. When the voltage of the second auxiliary battery 442 becomes equal to the voltage of the main battery 450, the second relay switch S42 is switched off and, as such, current may flow between the second auxiliary battery 442 and the main battery 450 via the second bypass circuit 432. In this case, the second auxiliary battery 442 may assist a function of an energy source for driving the motor of the main battery 450.

In this case, when the voltage of the third auxiliary battery 443 is higher than the voltage of the main battery 450, the third relay switch S43 is switched on until the voltage of the third auxiliary battery 443 becomes equal to the voltage of the main battery 450 and, as such, the main battery 450 is recharged with the voltage from the third auxiliary battery 443. When the voltage of the third auxiliary battery 443 becomes equal to the voltage of the main battery 450, the third relay switch S43 is switched off and, as such, current may flow between the third auxiliary battery 443 and the main battery 450 via the third bypass circuit 433. In this case, the third auxiliary battery 443 may assist a function of an energy source for driving the motor of the main battery 450.

Although the inductor L31 is shown as constituting a part of the power converter 430 in this embodiment, the inductor L31 may constitute a part of the on-board charger 420.

Meanwhile, although not shown, the power conversion system according to this embodiment may further include a relay controller and, as such, may control ON/OFF of the relay switches S41, S42, and S43 in accordance with a predetermined condition or a predetermined priority order.

The auxiliary battery 440 may include a plurality of auxiliary batteries 441, 442, and 443.

In this case, the auxiliary battery 440 may be a low-voltage output type battery and, may be, for example, a 48V standard battery. Although the auxiliary battery 440 is of a 48V standard, the auxiliary battery 440 may have an output in various ranges of 30 to 60V in accordance with a state of charge (SOC) thereof.

In this case, the auxiliary battery 440 may be provided in the form of a swappable battery.

Although the auxiliary battery 440 is shown as including three auxiliary batteries, that is, the first to third auxiliary batteries 441, 442, and 443 in this embodiment, this is only illustrative, and the auxiliary battery 440 may include various numbers of auxiliary batteries.

The main battery 450 is recharged with power, and supplies the charged power to a motor (not shown), thereby supplying rotation force to a wheel of a vehicle. In this case, the main battery 450 may be recharged by DC charging power supplied from the auxiliary battery 450. The main battery 450 may be a low-voltage output type battery and, may be, for example, a 48V standard battery. In this case, although the main battery 450 is of a 48V standard, the main battery 450 may have an output in various ranges of 30 to 60V in accordance with a state of charge (SOC) thereof.

In accordance with this embodiment, the auxiliary batteries are sequentially discharged and, as such, only the discharged auxiliary batteries may first be replaced. Accordingly, it may be possible to not only efficiently manage the capacity of the auxiliary battery, but also to reduce the cost incurred to configure the system through a reduction in circuit parts.

In accordance with the exemplary embodiments of the present invention described heretofore, it may be possible to not only stably manage a state of charge of the auxiliary battery, but also to effectively control charging current, and, as such, an increase in the range of the electric vehicle and an enhancement in power performance of the electric vehicle may be achieved.

In addition, the on-board charger (OBC) already equipped in the vehicle may be utilized as a converter for the auxiliary battery and, as such, conversion of the voltage of the auxiliary battery for recharging of the main battery may be achieved only through addition of a minimum number of elements.

Furthermore, it may be possible to achieve a reduction in cost by minimizing the capacity of the buck converter while designing the bypass circuit to have a high capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power conversion system comprising:
   an on-board charger;
   a main battery configured to be recharged with power and to supply the recharged power to a motor, thereby supplying rotation force to a wheel of a vehicle;
   an auxiliary battery configured to recharge the main battery or to assist a power supply function of the main battery; and a power converter connected to the auxiliary battery, the power converter comprising a bypass circuit and a buck switch, wherein a part of the on-board charger and the power converter constitute a DC-DC converter, and wherein the buck switch is configured to be repeatedly switched on and off when a voltage of the auxiliary battery is higher than a voltage of the main battery, and does not operate when the voltage of the auxiliary battery is not higher than the voltage of the main battery.

2. The power conversion system according to claim 1, wherein the DC-DC converter is configured to convert the voltage of the auxiliary battery into a voltage for recharging the main battery in accordance with the on and off switching of the buck switch.

3. The power conversion system according to claim 1, wherein the on-board charger comprises:

a transformer comprising a primary coil and a secondary coil;

a rectifier circuit comprising a plurality of diodes; and an inductor.

4. The power conversion system according to claim 3, wherein:

the bypass circuit comprises a plurality of bypass circuits, the buck switch comprises a plurality of buck switches, the transformer comprises a plurality of transformers, the rectifier circuit comprises a plurality of rectifier circuits, and the inductor comprises a plurality of inductors; and the auxiliary battery comprises a plurality of auxiliary batteries connected to respective bypass circuits, respective buck switches, respective secondary coils of respective transformers, respective rectifier circuits, and respective inductors, and a power supply path of each of the auxiliary batteries connected to the main battery is switched by a corresponding one of the bypass circuits and a corresponding one of the buck switches.

5. The power conversion system according to claim 3, wherein:

the bypass circuit comprises a plurality of bypass circuits; and the auxiliary battery comprises a plurality of auxiliary batteries connected to respective bypass circuits and respective relay switches;

each relay switch of the relay switches is configured to connect or disconnect a corresponding one of the auxiliary batteries to or from the buck switch, the secondary coil, the rectifier circuit, and the inductor; and a power supply path of each of the auxiliary batteries connected to the main battery is configured to be switched by the buck switch and the bypass circuit connected to the auxiliary battery.

6. The power conversion system according to claim 5, wherein the respective relay switches are configured to be set such that only one thereof is switched on at one time.

7. The power conversion system according to claim 6, wherein the respective relay switches are configured to be sequentially switched on in accordance with a predetermined priority order.

8. The power conversion system according to claim 1, wherein the auxiliary battery is provided in the form of a swappable battery.

9. The power conversion system according to claim 1, wherein the bypass circuit is configured to electrically interconnect the auxiliary battery and the main battery when the voltage of the auxiliary battery is equal to the voltage of the main battery.

10. The power conversion system according to claim 1, wherein the bypass circuit comprises:

a diode; and a bypass switch connected to the diode in series.

11. A method of operating a power system comprising a power converter connected to a main battery and an auxiliary battery, the method comprising:

using an on-board charger, receiving an AC power signal, and charging the main battery with power received from the AC power signal;

converting a voltage of the auxiliary battery into a voltage for recharging the main battery, converting the voltage comprising repeatedly switching a buck switch of the power converter on and off when the voltage of the auxiliary battery is higher than a voltage of the main battery, and not switching the buck switch when the voltage of the auxiliary battery is not higher than the voltage of the main battery; and supplying power from the main battery to a motor to provide rotation force to a wheel of a vehicle.

12. The method according to claim 11, wherein the on-board charger comprises:

a transformer comprising a primary coil and a secondary coil;

a rectifier circuit comprising a plurality of diodes; and an inductor.

13. The method according to claim 12, wherein:

the power converter further comprises a bypass circuit;

the bypass circuit comprises a plurality of bypass circuits, the buck switch comprises a plurality of buck switches, the transformer comprises a plurality of transformers, the rectifier circuit comprises a plurality of rectifier circuits, and the inductor comprises a plurality of inductors;

the auxiliary battery comprises a plurality of auxiliary batteries connected to respective bypass circuits, respective buck switches, respective secondary coils of respective transformers, respective rectifier circuits, and respective inductors; and the method further comprises switching, by a corresponding one of the bypass circuits and a corresponding one of the buck switches, a power supply path of each of the auxiliary batteries connected to the main battery.

14. The method according to claim 12, wherein:

the power converter further comprises a bypass circuit;

the bypass circuit comprises a plurality of bypass circuits;

the auxiliary battery comprises a plurality of auxiliary batteries connected to respective bypass circuits and respective relay switches; and the method further comprises:

connecting or disconnecting a corresponding one of the auxiliary batteries to or from the buck switch, the secondary coil, the rectifier circuit, and the inductor via each relay switch, and switching, by the buck switch and the bypass circuit connected to the auxiliary battery, a power supply path of each of the auxiliary batteries connected to the main battery.

15. The method according to claim 14, further comprising setting the respective relay switches such that only one relay switch is switched on at one time.

16. The method according to claim 15, further comprising sequentially switching on the respective relay switches in accordance with a predetermined priority order.

17. A power conversion system comprising:
an on-board charger configured to charge a main battery with power from an AC input; and
a power converter configured to recharge the main battery from an auxiliary battery, the power converter comprising a bypass circuit and a buck switch, wherein:
the main battery is configured to supply the power to a motor to provide rotation force to a wheel of a vehicle,
a part of the on-board charger and the power converter constitute a DC-DC converter, and
the buck switch is configured to be repeatedly switched on and off when a voltage of the auxiliary battery is higher than a voltage of the main battery, and does not operate when the voltage of the auxiliary battery is not higher than the voltage of the main battery.

18. The power conversion system according to claim 17, wherein the on-board charger comprises:
a transformer comprising a primary coil and a secondary coil;
a rectifier circuit comprising a plurality of diodes; and
an inductor.

19. The power conversion system according to claim 18, wherein:
the bypass circuit comprises a plurality of bypass circuits, the buck switch comprises a plurality of buck switches, the transformer comprises a plurality of transformers, the rectifier circuit comprises a plurality of rectifier circuits, and the inductor comprises a plurality of inductors; and
the auxiliary battery comprises a plurality of auxiliary batteries connected to respective bypass circuits, respective buck switches, respective secondary coils of respective transformers, respective rectifier circuits, and respective inductors, and a power supply path of each of the auxiliary batteries connected to the main battery is switched by a corresponding one of the bypass circuits and a corresponding one of the buck switches.

20. The power conversion system according to claim 18, wherein:
the bypass circuit comprises a plurality of bypass circuits; and
the auxiliary battery comprises a plurality of auxiliary batteries connected to respective bypass circuits and respective relay switches;
each relay switch of the relay switches is configured to connect or disconnect a corresponding one of the auxiliary batteries to or from the buck switch, the secondary coil, the rectifier circuit, and the inductor; and
a power supply path of each of the auxiliary batteries connected to the main battery is configured to be switched by the buck switch and the bypass circuit connected to the auxiliary battery.

* * * * *